(12) United States Patent
Li

(10) Patent No.: US 12,455,322 B2
(45) Date of Patent: Oct. 28, 2025

(54) METHOD FOR TESTING INTERNAL RESISTANCE OF BATTERY, AND ELECTRONIC DEVICE

(71) Applicant: Honor Device Co., Ltd., Shenzhen (CN)

(72) Inventor: Zhifang Li, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 0 days.

(21) Appl. No.: 18/271,525

(22) PCT Filed: Dec. 13, 2022

(86) PCT No.: PCT/CN2022/138754
§ 371 (c)(1),
(2) Date: Jul. 10, 2023

(87) PCT Pub. No.: WO2023/130919
PCT Pub. Date: Jul. 13, 2023

(65) Prior Publication Data
US 2025/0004060 A1    Jan. 2, 2025

(30) Foreign Application Priority Data
Jan. 7, 2022  (CN) .......................... 202210011936.9

(51) Int. Cl.
G01R 31/389 (2019.01)
G01R 31/3835 (2019.01)
H02J 7/00 (2006.01)

(52) U.S. Cl.
CPC ....... *G01R 31/389* (2019.01); *G01R 31/3835* (2019.01); *H02J 7/0068* (2013.01)

(58) Field of Classification Search
None
See application file for complete search history.

(56) References Cited

U.S. PATENT DOCUMENTS

| | | | |
|---|---|---|---|
| 5,422,558 A * | 6/1995 | Stewart ................. | H02J 7/0013 320/120 |
| 5,751,134 A | 5/1998 | Hoerner et al. | |
| 7,923,966 B2 | 4/2011 | Fukuda | |
| 9,331,512 B2 | 5/2016 | Tsukamoto | |
| 10,277,051 B2 | 4/2019 | Liang et al. | |
| 10,819,127 B2 | 10/2020 | Liu et al. | |
| 2006/0082375 A1* | 4/2006 | Coates ................. | G01R 31/389 324/430 |
| 2013/0181675 A1 | 7/2013 | Kawasaki et al. | |

(Continued)

FOREIGN PATENT DOCUMENTS

| | | |
|---|---|---|
| CN | 101141077 A | 3/2008 |
| CN | 201397381 Y | 2/2010 |

(Continued)

*Primary Examiner* — Jas A Sanghera
(74) *Attorney, Agent, or Firm* — Slater Matsil, LLP (57) ABSTRACT

A method includes: obtaining an in-position status of a charger of the electronic device; turning off a first switch if the charger of the electronic device is in position, where the first switch is located between a load of the electronic device and a battery of the electronic device; and after the load is disconnected from the battery, detecting a change of an internal resistance of the battery to obtain an internal resistance test result.

20 Claims, 5 Drawing Sheets

(56) References Cited

U.S. PATENT DOCUMENTS

| | | | |
|---|---|---|---|
| 2015/0035475 A1* | 2/2015 | Li | H02J 7/00309 |
| | | | 320/107 |
| 2019/0131811 A1 | 5/2019 | Mikuteit et al. | |
| 2019/0222047 A1 | 7/2019 | Chen | |
| 2020/0081069 A1 | 3/2020 | Chen et al. | |
| 2023/0084079 A1* | 3/2023 | Kwak | G01R 31/392 |
| | | | 324/432 |
| 2023/0268763 A1 | 8/2023 | Li | |

FOREIGN PATENT DOCUMENTS

| | | |
|---|---|---|
| CN | 102074984 A | 5/2011 |
| CN | 103048623 A | 4/2013 |
| CN | 202854303 U | 4/2013 |
| CN | 103250320 A | 8/2013 |
| CN | 103760492 A | 4/2014 |
| CN | 104303386 A | 1/2015 |
| CN | 104880673 A | 9/2015 |
| CN | 106443489 A | 2/2017 |
| CN | 106451609 A | 2/2017 |
| CN | 106786838 A | 5/2017 |
| CN | 107231014 A | 10/2017 |
| CN | 107607881 A | 1/2018 |
| CN | 108983029 A | 12/2018 |
| CN | 109596996 A | 4/2019 |
| CN | 109802457 A | 5/2019 |
| CN | 111146831 A | 5/2020 |
| CN | 114035093 A | 2/2022 |
| EP | 0544121 A1 | 6/1993 |
| JP | 2014183682 A | 9/2014 |
| TW | 201817116 A | 5/2018 |

* cited by examiner

METHOD FOR TESTING INTERNAL RESISTANCE OF BATTERY, AND ELECTRONIC DEVICE

CROSS-REFERENCE TO RELATED APPLICATIONS

This application is a national stage of International Application No. PCT/CN2022/138754, filed on Dec. 13, 2022, which claims priority to Chinese Patent Application No. 202210011936.9, filed on Jan. 7, 2022. The disclosures of both of the aforementioned applications are hereby incorporated by reference in their entireties.

TECHNICAL FIELD

This application relates to the field of electronics, and in particular, to a method for testing an internal resistance of a battery, and an electronic device.

BACKGROUND

Electronic devices such as mobile phones and laptops all need mobile batteries, such as common lithium-ion batteries. During use, battery faults such as abnormal liquid leakage may occur. An internal resistance of a battery is an important characteristic index used to reflect battery performance. The internal resistance of the battery is identified in advance to remind a user to replace the battery in advance, so that severe accidents such as battery explosion can be avoided.

Therefore, how to accurately obtain the internal resistance of the battery has become a problem that needs to be solved at present.

SUMMARY

This application provides a method for testing an internal resistance of a battery, and an electronic device, to accurately obtain an internal resistance of a battery.

According to a first aspect, this application provides a method for testing an internal resistance of a battery, which is applied to an electronic device. The method includes: obtaining an in-position status of a charger of the electronic device; turning off a first switch if the charger of the electronic device is in position, where the first switch is located between a load of the electronic device and a battery of the electronic device; and after the load is disconnected from the battery, detecting a change of an internal resistance of the battery to obtain an internal resistance test result.

According to the foregoing method, the first switch is used to disconnect the load from the battery, to avoid impact of the load on a detection result of the internal resistance of the battery during testing and increase test accuracy of the internal resistance of the battery.

In a possible implementation, the first switch is located outside the battery, a first terminal of the first switch is connected to the load of the electronic device, a second terminal of the first switch is connected to a power supply output port of the battery, and a control terminal of the first switch is connected to a processor of the electronic device.

A method for disposing the first switch is provided herein, so that the load is disconnected from the battery during detection of the internal resistance of the battery, to avoid impact of the load on a detection result of the internal resistance of the battery during testing and increase test accuracy of the internal resistance of the battery. The first switch is disposed outside the battery, and an improvement process is simple.

In a possible implementation, the first switch is integrated in the battery, a first terminal of the first switch is connected to a power supply output port of the battery, a second terminal of the first switch is connected to a power supply output port of an cell in the battery, and a control terminal of the first switch is connected to a processor of the electronic device.

A method for disposing the first switch is provided herein, so that the load is disconnected from the battery during detection of the internal resistance of the battery, to avoid impact of the load on a detection result of the internal resistance of the battery during testing and increase test accuracy of the internal resistance of the battery. The first switch is disposed inside the battery and an integration level is higher. Internal resistances at both ends of the cell are directly detected, and the detection result is more accurate.

In a possible implementation, before the turning off a first switch, the method further includes: turning on a charging chip of the electronic device, so that the charging chip supplies power to the load of the electronic device based on a power supply signal input by the charger.

By such disposition, in a test scenario, the charger is used to ensure the normal power supply of an internal load of the electronic device.

In a possible implementation, the charging chip of the electronic device includes a fast charging chip and a BUCK chip; and the turning on a charging chip of the electronic device includes: turning on the fast charging chip and turning off the BUCK chip.

The foregoing disposition further limit a power supply method for the internal load in the test scenario. That is, the fast charging chip ensures the normal power supply of the internal load. Because some loads connected to a Vbat network inside the electronic device cannot be powered by the BUCK chip, the loads can only be powered by the fast charging chip.

In a possible implementation, after the detecting a change of an internal resistance of the battery when the first switch is in an off state, to obtain an internal resistance test result, the method further includes: turning on the first switch to connect the battery to the load.

In this way, after the test scenario ends, a scenario of normal use for the user is restored, and the internal load of the electronic device is normally powered by the battery.

In a possible implementation, the detecting a change of an internal resistance of the battery to obtain an internal resistance test result includes: measuring an open-circuit voltage of the battery or the cell at each of a start moment and an end moment of a testing period, to obtain a drop rate of the open-circuit voltage, where the drop rate indicates a magnitude of the internal resistance; performing a plurality of tests at preset intervals; and comparing drop rates of two consecutive tests, where when a difference between the drop rates is greater than a preset threshold, it indicates that the internal resistance increases, and an increase in the internal resistance indicates that the battery is faulty.

A method for detecting the internal resistance of the battery is provided herein, including: detecting drop values of the open-circuit voltages of the battery or cell within a period of time; and repeating the tests after preset time intervals. When a drop rate of the open-circuit voltage is greater than a drop rate of a previous test and is higher than a specified threshold, it indicates that the internal resistance of the battery or cell increases and the battery is faulty, and the user needs to be prompted to replace the battery.

According to a second aspect, this application provides an electronic device, including: a processor, a battery detection module, a first switch, a battery, and a load. The processor is configured to turn off the first switch if a charger of the electronic device is in-position, and the first switch is located between the load of the electronic device and the battery of the electronic device. The battery detection module is configured to: after the load is disconnected from the battery, detect a change of an internal resistance of the battery to obtain an internal resistance test result.

In a possible implementation, the first switch is located outside the battery, a first terminal of the first switch is connected to the load, a second terminal of the first switch is connected to a power supply output port of the battery, and a control terminal of the first switch is connected to the processor of the electronic device.

In a possible implementation, the first switch is integrated in the battery, a first terminal of the first switch is connected to a power supply output port of the battery, a second terminal of the first switch is connected to a power supply output port of an cell in the battery, and a control terminal of the first switch is connected to the processor of the electronic device.

In a possible implementation, the processor is further configured to turn on a charging chip of the electronic device, so that the charging chip supplies power to the load of the electronic device based on a power supply signal input by the charger.

In a possible implementation, the charging chip of the electronic device includes a fast charging chip and a BUCK chip; and the processor is specifically configured to turn on the fast charging chip and turn off the BUCK chip.

In a possible implementation, the processor is further configured to: after the internal resistance of the battery is detected to obtain the internal resistance test result after the load is disconnected from the battery, turn on the first switch to connect the battery and the load.

In a possible implementation, the battery detection module is specifically configured to: measure an open-circuit voltage of the battery or an cell of the battery at each of a start moment and an end moment of a testing period, to obtain a drop rate of the open-circuit voltage, where the drop rate indicates a magnitude of the internal resistance of the battery; repeat tests at preset intervals; and compare drop rates of two consecutive tests, where when a difference between the drop rates is greater than a preset threshold, it indicates that the internal resistance increases, and an increase in the internal resistance indicates that the battery is faulty.

According to a third aspect, an embodiment of this application provides a computer-readable storage medium. The computer-readable storage medium stores instructions, and when the instructions are executed, a computer is caused to perform the interface setting method described in any one of the first aspect or the implementations of the first aspect.

According to a fourth aspect, a computer program product is provided, including a computer program. When the computer program is run, a computer is caused to perform the interface setting method described in any one of the first aspect or the implementations of the first aspect.

It should be understood that the second aspect to the fourth aspect of this application correspond to the technical solution of the first aspect of this application, and the beneficial effects obtained by each aspect and the corresponding feasible implementations are similar. Details are not described herein again.

BRIEF DESCRIPTION OF THE DRAWINGS

The accompanying drawings which are incorporated into this specification and constitute a part of this specification illustrate the embodiments consistent with this application and serve to explain the principles of this application together with this specification.

Through the above accompanying drawings, specific embodiments of this application have been shown, and will be described in more detail below. These accompanying drawings and written descriptions are not intended to limit the scope of the concept of this application in any way, but to explain the concept of this application to persons skilled in the art by reference to specific embodiments.

DETAILED DESCRIPTION OF ILLUSTRATIVE EMBODIMENTS

Herein, example embodiments will be described in detail, and examples thereof are shown in the accompanying drawings. When the following description refers to the accompanying drawings, unless otherwise indicated, the same reference numerals in different drawings indicate the same or similar elements. Implementations described in the following example embodiments do not represent all implementations consistent with this application. Instead, they are merely examples of an apparatus and a method in accordance with some aspects of this application.

For ease of describing the technical solutions in the embodiments of this application clearly, in the embodiments of this application, words such as "first" and "second" are used to distinguish between same or similar items with basically same functions and roles. For example, a first value and a second value are used only to distinguish different values, without limiting the order thereof. Those skilled in the art can understand that the terms "first", "second", and the like do not limit the number and execution order, and the terms "first", "second", and the like do not necessarily imply a difference.

It should be noted that in this application, the term such as "exemplary" or "for example" is used to represent giving an example, an illustration, or a description. Any embodiment or design described by "exemplary" or "for example" in this application should not be construed as being preferred or more advantageous over other embodiments or designs.

To be precise, the use of the term such as "exemplary" or "for example" is intended to present a related concept in a specific manner.

In this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following" or similar expressions refer to any combination of these items, including any combination of single items or a plurality of items. For example, at least one of a, b, or c may represent a, b, c, a and b, a and c, b and c, or a, b, and c, where a, b, and c may be singular or plural.

Electronic devices such as mobile phones and laptops all need mobile batteries, such as common lithium-ion batteries. During use, battery faults such as abnormal liquid leakage may occur. An internal resistance of a battery is an important characteristic index used to reflect battery performance. The internal resistance of a battery is identified in advance to remind users to replace batteries in advance, so that severe accidents such as battery explosion can be avoided.

Figure 1:
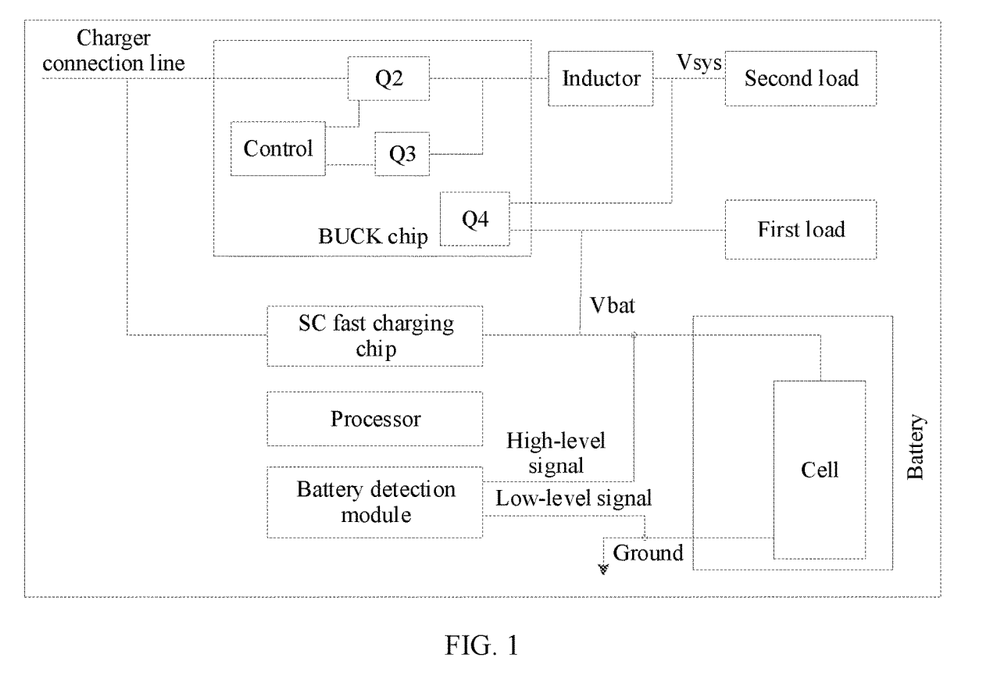
FIG. 1 is a schematic diagram of an example charging system of an electronic device.

In a technology, a battery voltage difference between two time periods is tested when a mobile phone is in a standby mode with a small current, and then a change of the internal resistance of the battery is calculated, so that whether the battery is faulty is judged based on the change in internal resistance. FIG. 1 is a schematic diagram of an example charging system of an electronic device. As shown in FIG. 1, the charging system includes a BUCK chip, an SC fast charging chip, an inductor, a processor, a battery detection module, a battery, a first load powered by a Vbat network, and a second load powered by a Vsys network. The battery includes an cell, and VBUS is a connection line of a charger, indicating that the electronic device is connected to the charger. That is, the charger is in position. The BUCK chip is responsible for normal charging. When a battery voltage is lower than a specified threshold or higher than a specified threshold, the BUCK chip is configured for low-current charging. The SC fast charging chip is responsible for fast charging. When the battery voltage is within a specified range, the SC fast charging chip is configured for high-current charging. During a charging process, one of the two chips is selected to be responsible for charging based on a battery voltage value.

The BUCK chip includes a transistor Q2, a transistor Q3, a transistor Q4, and a control module. The transistor Q2 and the transistor Q3 are respectively an upper MOS transistor and a lower MOS transistor in a BUCK buck circuit, and a change of an output terminal voltage is implemented by periodically charging and discharging the inductor. The transistor Q4 acts as a switch and can be configured to control whether to charge the battery. For example, if the system detects that the battery is fully charged, the transistor Q4 can be turned off by software and the battery is not charged. The control module is configured to accept an instruction of the system and control a working status of the BUCK chip, that is, turn off or turn on the BUCK chip.

However, it is found that the internal load in the foregoing testing method affects test accuracy of the internal resistance of the battery. As shown in FIG. 1, the battery detection module detects a voltage difference between two ends of the battery. A power source of the Vbat network for the first load comes from the battery. If a component in the first load is abnormal, a real change of the internal resistance of the battery cannot be truly reflected.

In view of this, this application provides a method for testing an internal resistance of a battery, and an electronic device. A switch is disposed to isolate a first load from the battery, to avoid impact of a load on a detection result of the internal resistance of the battery during testing and increase test accuracy of the internal resistance of the battery.

It may be understood that, the above terminal device may also be referred to as a terminal (terminal), user equipment (user equipment, UE), a mobile station (mobile station, MS), a mobile terminal (mobile terminal, MT), or the like. The terminal device may be a mobile phone (mobile phone), a smart television, a wearable device, a tablet computer (Pad), a computer having a wireless transceiver function, a virtual reality (Virtual Reality, VR) terminal device, an augmented reality (augmented reality, AR) terminal device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like. The embodiments of this application impose no limitation on a specific technology and a specific device form used by the electronic device.

Figure 2:
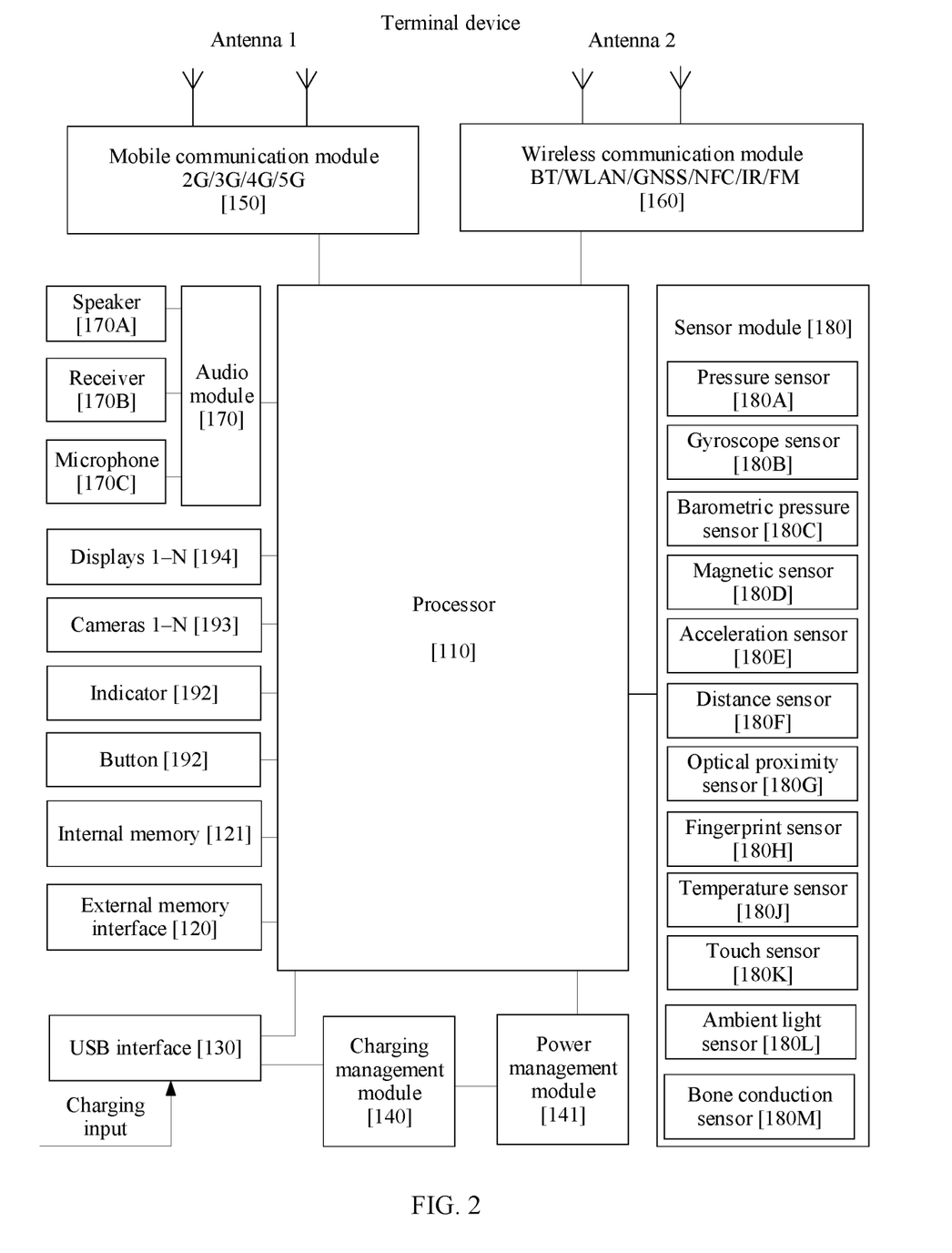
FIG. 2 is a schematic diagram of a structure of a terminal device according to an embodiment of this application.

To better understand the embodiments of this application, the following describes a structure of the terminal device in the embodiments of this application. For example, FIG. 2 is a schematic diagram of a structure of a terminal device according to an embodiment of this application.

The terminal device may include a processor 110, an external memory interface 120, an internal memory 121, a universal serial bus (universal serial bus, USB) interface 130, a charging management module 140, a power management module 141, an antenna 1, an antenna 2, a mobile communication module 150, a wireless communication module 160, an audio module 170, a speaker 170A, a receiver 170B, a microphone 170C, a sensor module 180, a button 190, an indicator 192, a camera 193, a display 194, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of this application does not constitute a specific limitation on the terminal device. In some other embodiments of this application, the terminal device may include more or fewer components than those shown in the figure, or some components may be combined, or some components may be split, or a different component arrangement may be used. The components shown in the figure may be implemented in hardware, software, or a combination of software and hardware.

The processor 110 may include one or more processing unit. Different processing units may be separate devices, or may be integrated in one or more processors. A memory may be further disposed in the processor 110, and is configured to store instructions and data.

A USB interface 130 is an interface conforming to the USB standard specifications, and may be specifically a Mini USB interface, a Micro USB interface, a USB Type C interface, or the like. The USB interface 130 may be configured to connect to a charger to charge the terminal device, or may be configured to transmit data between the terminal device and a peripheral device. The USB interface 130 may also be configured to connect to a headset to play audio through the headset. The interface may also be configured to connect to another electronic device such as an AR device.

The charging management module 140 is configured to receive a charging input from a charger. The charger may be a wireless charger or a wired charger. The power management module 141 is configured to connect to the charging management module 140 and the processor 110.

A wireless communication function of the terminal device may be implemented by using the antenna 1, the antenna 2, the mobile communication module 150, the wireless communication module 160, a modem processor, a baseband processor, and the like.

The antenna 1 and the antenna 2 are configured to transmit or receive an electromagnetic wave signal. An antenna in the terminal device may be configured to cover one or more communications frequency bands. Different antennas can also be reused to improve antenna utilization.

The mobile communication module 150 may provide a wireless communication solution that is applied to the terminal device, including 2G/3G/4G/5G and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation.

The wireless communication module 160 may provide a solution for wireless communication including wireless local area networks (wireless local area networks, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), and the like to be applied to the terminal device.

The terminal device implements a display function by using a GPU, the display 194, an application processor, and the like. The GPU is an image processing microprocessor and is connected to the display 194 and the application processor. The GPU is configured to perform mathematical and geometric computation for graphic rendering.

The display 194 is configured to display an image, a video, and the like. The display 194 includes a display panel. In some embodiments, the terminal device may include one or N displays 194, where N is a positive integer greater than 1.

The terminal device may implement a photographing function by using an ISP, the camera 193, a video codec, the GPU, the display 194, the application processor, and the like.

The camera 193 is configured to capture a static image or a video. In some embodiments, the terminal device may include one or N cameras 193, wherein N is a positive integer greater than 1.

The external memory interface 120 may be configured to connect to an external memory card such as a Micro SD card, to expand a storage capacity of the terminal device. The external storage card communicates with the processor 110 through the external memory interface 120, to implement a data storage function. For example, files such as music and a video are stored in the external storage card.

The internal memory 121 may be configured to store computer executable program code, and the executable program code includes an instruction. The internal memory 121 may include a program storage area and a data storage area.

The terminal device may implement an audio function, such as music playback and recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The speaker 170A, also referred to as a "loudspeaker", is configured to convert an audio electrical signal into a sound signal. The terminal device may be used to listen to music or answer a call in a hands-free mode over the speaker 170A. The receiver 170B, also referred to as an "earpiece", is configured to convert an audio electrical signal into a sound signal. When a call is answered or a voice message is received by using the terminal device, the receiver 170B may be put close to a human ear to receive the voice. The microphone 170C, also referred to as a "mic" or "microphone", is configured to convert sound signals into electrical signals.

The pressure sensor 180A is configured to sense a pressure signal, and can convert the pressure signal into an electrical signal. In some embodiments, the pressure sensor 180A may be disposed in the display 194. The gyroscope sensor 180B may be configured to determine a motion posture of the terminal device. The barometric pressure sensor 180C is configured to measure atmospheric pressure. The magnetic sensor 180D includes a Hall sensor. The acceleration sensor 180E may detect magnitudes of accelerations in all directions (usually three axes) of the terminal device. The distance sensor 180F is configured to measure a distance. The optical proximity sensor 180G may include, for example, a light-emitting diode (LED) and an optical detector such as a photodiode. The ambient light sensor 180L is configured to sense luminance of ambient light. The fingerprint sensor 180H is configured to collect a fingerprint. The temperature sensor 180J is configured to detect a temperature. The touch sensor 180K is also referred to as a "touch device". The touch sensor 180K may be disposed on the display 194, and the touch sensor 180K and the display 194 form a touchscreen, which is also referred to as a "touch screen". The bone conduction sensor 180M may collect a vibration signal.

The button 190 includes a power on/off button, a volume button, and the like. The button 190 may be a mechanical button, or may be a touch-sensitive button. The terminal device may receive a button input, generate a button signal input related to user setting and function control of the terminal device. The indicator 192 may be an indicator light that may be configured to indicate a charging state and a power change, or may be configured to indicate a message, a missed call, a notification, and the like.

A software system of the terminal device may use a layered architecture, an event-driven architecture, a microkernel architecture, a micro service architecture, or a cloud architecture like. Details are not described herein again.

The technical solutions of this application and how the technical solutions of this application resolve the foregoing technical problems are described in detail below with specific embodiments. The following several specific embodiments may be implemented separately, or may be combined with each other, and the same or similar concepts or processes may not be repeated in some embodiments.

Embodiment 1

Figure 3:
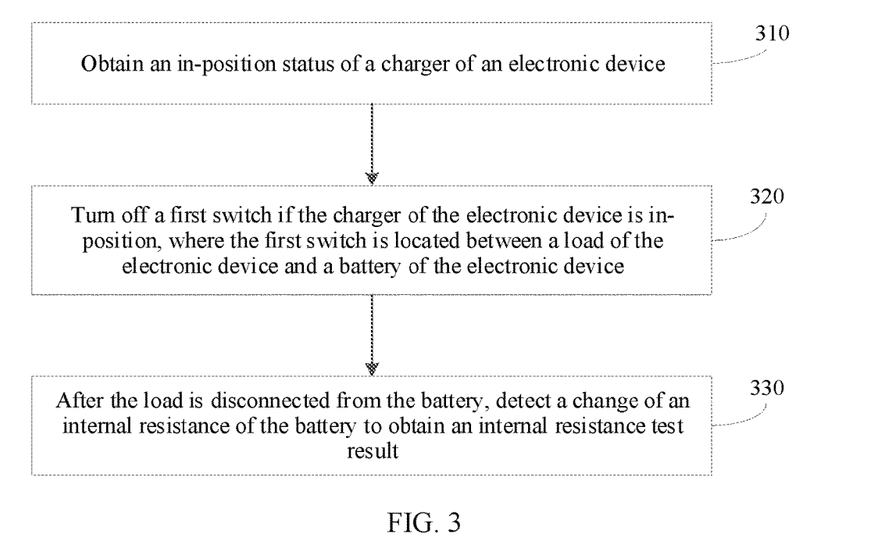
FIG. 3 is a schematic flowchart of a method for testing an internal resistance of a battery according to Embodiment 1 of this application.

FIG. 3 is a schematic flowchart of a method for testing an internal resistance of a battery according to Embodiment 1 of this application. As shown in FIG. 3, the method for testing an internal resistance of a battery may include the following steps.

S310: Obtain an in-position status of a charger of an electronic device.

S320: Turn off a first switch if the charger of the electronic device is in-position, where the first switch is located between a load of the electronic device and a battery of the electronic device.

S330: After the load is disconnected from the battery, detect a change of an internal resistance of the battery to obtain an internal resistance test result.

Specifically, a triggering condition of the method for testing an internal resistance of a battery provided in this embodiment of this application is: the charger is in position and a user is fully charged and in a standby state. When the electronic device is still connected to the charger when fully charged, charging is not actually performed. The standby state may refer to a scenario where the electronic device is not currently being used and no application program is running. For example, the user connects the charger to a mobile phone before going to sleep at night, hoping to fully charge the mobile phone during rest for use the next day. During this period of time, the mobile phone is not used, and the charger is not unplugged immediately after the mobile phone is fully charged. Therefore, when the mobile phone is fully charged, the triggering condition of the method for testing the internal resistance of the battery provided by this embodiment of this application can be met.

The foregoing method for testing the internal resistance of the battery is applied to the electronic device. When the internal resistance of the battery of the electronic device is detected, the load is disconnected from the battery by using the first switch, to prevent the load from affecting the internal resistance test result.

The following uses an example to describe a position at which the first switch is disposed.

Figure 4:
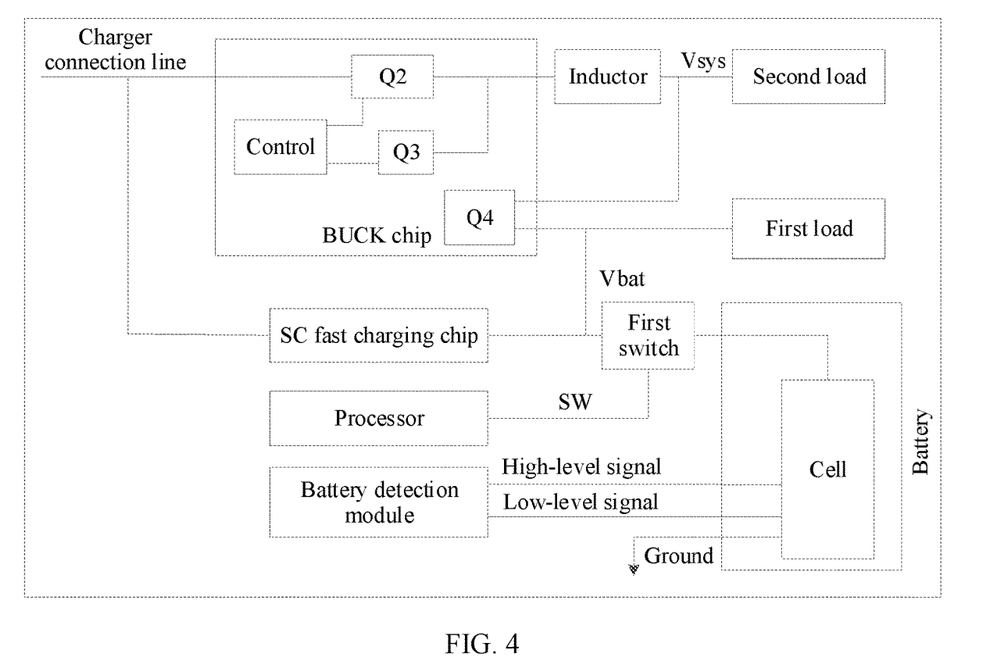
FIG. 4 is a schematic diagram of a charging system according to Embodiment 1 of this application.

A feasible manner is provided in FIG. 4, which is a schematic diagram of a charging system according to Embodiment 1 of this application. FIG. 4 shows an improvement on the basis of FIG. 1. A first switch is located outside a battery, a first terminal of the first switch is connected to a load (namely, the first load shown in FIG. 4) of an electronic device, a second terminal of the first switch is connected to a power supply output port of the battery, and a control terminal of the first switch is connected to a processor of an electronic device.

Specifically, the processor is configured with an SW pin for controlling an on/off state of the first switch. During internal resistance detection, the processor controls the first switch to turn off through the SW pin, to disconnect a Vbat network from the battery. In other words, the battery does not supply power to the first load. After internal resistance detection ends, the processor controls the first switch to turn on through the SW pin, to connect the Vbat network to the battery through the SW pin. In other words, the battery restores power supply to the first load.

The foregoing method of disposing the first switch outside the battery has a simple improvement process, so that the load is disconnected from the battery during detection of the internal resistance of the battery, to avoid impact of the load on a detection result of the internal resistance of the battery during testing and increase test accuracy of the internal resistance of the battery.

Figure 5:
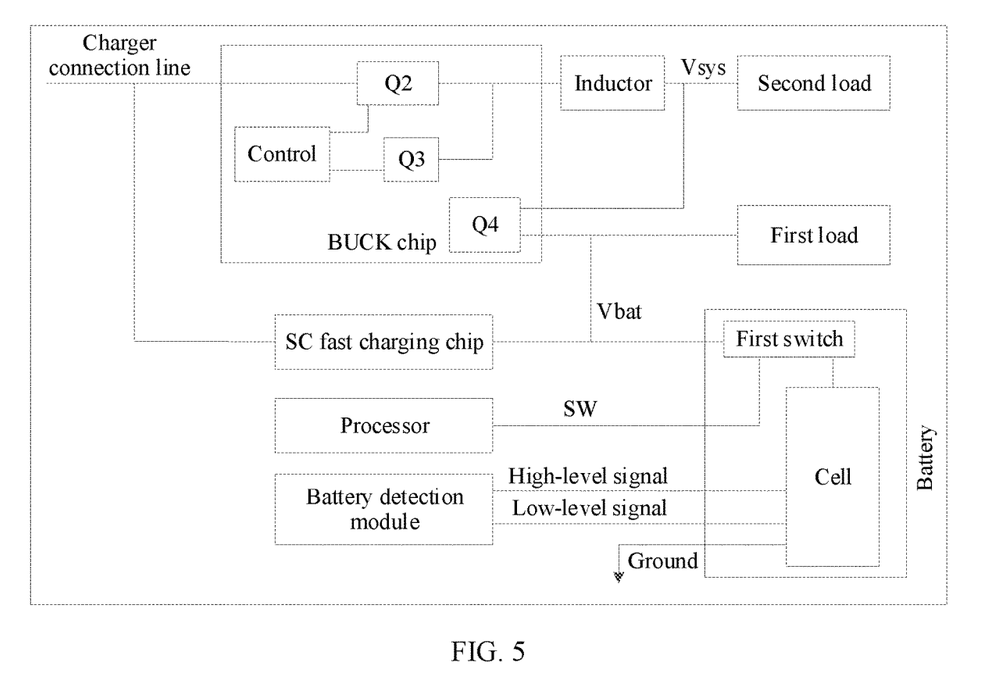
FIG. 5 is a schematic diagram of another charging system according to Embodiment 1 of this application.

A feasible manner is provided in FIG. 5, which is a schematic diagram of another charging system according to Embodiment 1 of this application. FIG. 5 shows an improvement on the basis of FIG. 1. A first switch is integrated in a battery, a first terminal of the first switch is connected to a power supply output port of the battery, a second terminal of the first switch is connected to a power supply output port of an cell in the battery, and a control terminal of the first switch is connected to a processor of an electronic device.

Specifically, the processor is configured with an SW pin for controlling an on/off state of the first switch. During internal resistance detection, the processor disconnects a Vbat network from the battery through the SW pin. In other words, the battery does not supply power to a first load. After internal resistance detection ends, the processor connects the Vbat network to the battery through the SW pin. In other words, the battery restores power supply to the first load.

The foregoing method of disposing the first switch inside the battery has a higher integration level, so that the load is disconnected from the battery during detection of the internal resistance of the battery, to avoid impact of the load on a detection result of the internal resistance of the battery during testing and increase test accuracy of the internal resistance of the battery.

Further, compared with FIG. 1, in FIG. 4 and FIG. 5, a battery detection module detects the internal resistance of the battery in a different manner. Signal detection points for voltage detection of the battery detection module shown in FIG. 1 are selected at both ends of the battery. Signal detection points for voltage detection of the battery detection module described in FIG. 4 and FIG. 5 are selected at both ends of the cell in the battery. Voltages at both ends of the cell are directly detected, and the detection result is more accurate.

In the foregoing example, within a testing time, power supply of the battery to the Vbat network is disconnected through the first switch. To ensure normal operation of the electronic device, some loads need to be powered in another manner. Therefore, in a possible implementation, before S320, the method further includes step of S311 of turning on a charging chip of the electronic device, so that the charging chip supplies power to the load of the electronic device based on a power supply signal input by the charger. That is, an internal load of the electronic device is powered by an external power source through an in-position charger.

Further, as shown in FIG. 4 and FIG. 5, the charging chip of the electronic device includes a fast charging chip and a BUCK chip. S311 specifically includes step of S112 of turning on the fast charging chip and turning off the BUCK chip.

Specifically, after the battery internal resistance test starts, the charger supplies power to the Vbat network through an SC fast charging chip in an on state, and then supplies power to the first load. A Q4 transistor component in the BUCK chip is connected, and the fast charging chip supplies power to a Vsys network through the connected Q4 transistor component, thereby supplying power to a second load.

It should be noted that the charger can supply power to only the Vsys network through the BUCK chip and cannot supply power to the Vbat network through the Q4 transistor device, which is related to the charging chip disposed inside the electronic device. Therefore, in order to ensure the normal power supply of the load connected to the Vsys network and the load connected to the Vbat network, the SC fast charging chip is turned on, and the BUCK chip is turned off. In addition, power may be supplied, in another manner, to the first load connected to the Vbat network during testing, which is not limited in this application. During actual application, a model of the charging chip disposed inside the electronic device should be considered.

Further, after S330, the method further includes step S340 of turning on the first switch to connect the battery and the load. That is, after the test scenario ends, a scenario of normal use for the user is restored, and the internal load of the electronic device is normally powered by the battery.

In an example, the battery detection module is configured to detect a voltage across the two ends of the battery or the cell by using a differential method. The method specifically includes the following steps.

S401: Measure an open-circuit voltage of the battery or the cell at each of a start moment and an end moment of a testing period, to obtain a drop rate of the open-circuit voltage, where the drop rate indicates a magnitude of the internal resistance of the battery. S402: Perform a plurality of tests at preset intervals.

S403: Compare drop rates of two consecutive tests, where when a difference between the drop rates is greater than a preset threshold, it indicates that the internal resistance increases, and an increase in the internal resistance indicates that the battery is faulty.

As shown FIG. 4 and FIG. 5, the battery detection module collects a high-level signal Vbat+sense and a low-level signal Vbat-sense of the cell, and a difference between the high-level signal Vbat+sense and the low-level signal Vbat-sense is obtained as a real difference OCV(T) between two ends of the cell, namely, an open-circuit voltage (open circuit voltage, OCV for short) at a moment T.

OCV(T0) and OCV(T1) may be obtained at a start moment T0 and an end moment T1 of a testing period respectively. In the testing period, a drop rate of an open-circuit voltage is: [OCV(T1)−OCV(T0)]/(T1−T0). A greater value of the internal resistance of the battery indicates a greater drop rate.

The preset interval may be seven days, 10 days, or longer. Seven days are used as an example. Four drop rates may be obtained through detection and calculation within 28 days. In each of first three tests, an open-circuit voltage drops from 4.2 V to 4.1 V. In a fourth test, an open-circuit voltage drops from 4.2 V to 3.8 V. A drop rate in the fourth test is greater than a drop rate in each of the first three tests, which indicates an increase in the internal resistance of the battery. It should be noted that the foregoing example is used only to describe how the internal resistance of the battery is detected and how the battery is determined to be faulty in this embodiment of this application. During actual application, a fluctuation in values of the drop rates in two consecutive tests is allowed. When the difference between the drop rates in two consecutive tests is greater than the preset threshold, it is considered that the battery is at risk of a fault, and a reminder to replace the battery may be provided.

In another example, in a manner of determining a battery fault, the open-circuit voltage at the start moment of the testing period may be set as a fixed value, and the open-circuit voltage at the end moment of the testing period is set as a threshold, to determine the drop rate of the open-circuit voltage during the testing period, thereby determining whether there is a risk of a battery fault.

In still another example, in the manner of determining the battery fault, the drop rate of the open-circuit voltage within the testing period may further be used to obtain a corresponding resistance value, and a threshold is set to determine whether there is a risk of a battery fault.

It may be understood that the manner of detecting the internal resistance of the battery provided in the embodiments of this application is only an example, and does not constitute a further limitation on the embodiments of this application. This application does not limit the manner of detecting the internal resistance by the battery detection module, and does not limit the manner of determining whether there is a risk of a battery fault. In an application process, the manner may be set according to actual situations.

The following uses a specific embodiment to describe in detail the method for testing an internal resistance of a battery provided in this embodiment of this application. When the charger is in position and the user is fully charged and in a standby state, the method is performed. A processing procedure is as follows:

(1) Turn on SC fast charging and turn off buck, where a Vbat network voltage is provided by an SC fast charging chip.

(2) A processor controls an SW pin to turn off a first switch.

(3) Set a voltage of an internal cell to be in an open-circuit state for a period of time.

(4) Measure voltages of the cell at moments T0 and T1, and record the voltages of the cell at the moments T0 and T1 as OCV(T0) and OCV(T1).

(5) Exit a test scenario and restore to a scenario of normal use for the user.

(6) Repeat steps (1) to (5) at intervals such as 10 days or longer. Record as $OCV_1(T0)$ and $OCV_1(T1)$.

Figure 6:
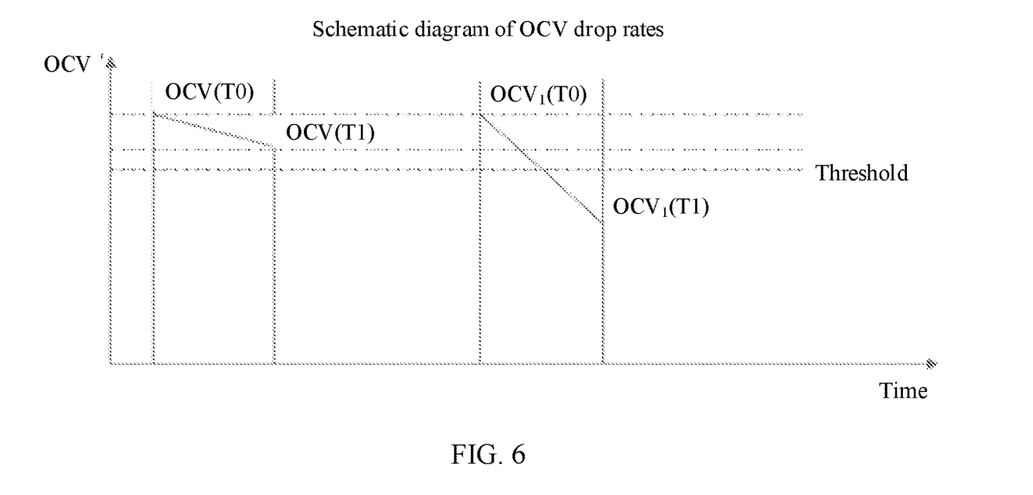
FIG. 6 is a schematic diagram of a voltage detection result according to Embodiment 1 of this application.

(7) Compare drop rates of OCV voltages of two consecutive times. FIG. 6 is a schematic diagram of a voltage detection result according to Embodiment 1 of this application. As shown in FIG. 6, if the drop rate is significant, it indicates an increase in the internal resistance of the battery. After the internal resistance of the battery reaches a specific threshold, and the user may be prompted.

In conclusion, Embodiment 1 of this application provides a method for testing an internal resistance of a battery, applied to an electronic device. The method includes: obtaining an in-position status of a charger of the electronic device; turning off a first switch if the charger of the electronic device is in position, where the first switch is located between a load of the electronic device and a battery of the electronic device; and after the load is disconnected from the battery, detecting a change of an internal resistance of the battery to obtain an internal resistance test result. In this way, the load is disconnected from the battery through the first switch, so as to avoid impact of the load on an internal resistance detection result of the battery during testing. This improves an accuracy of a battery internal resistance test.

Embodiment 2

Figure 7:
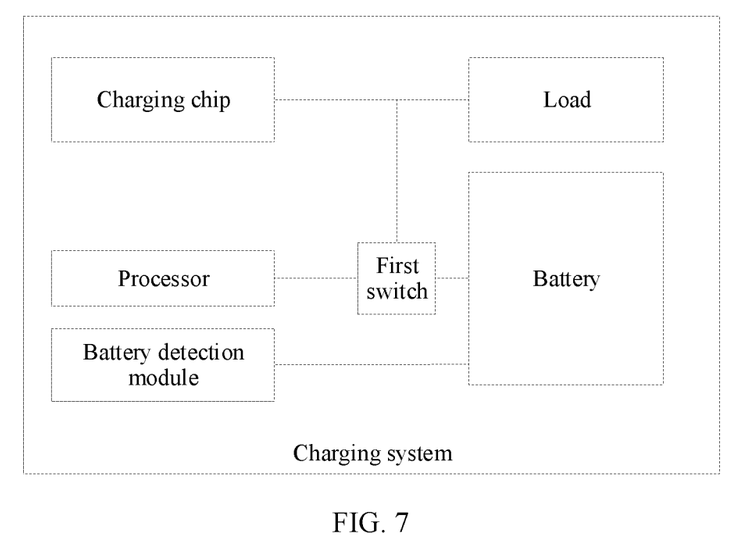
FIG. 7 is a schematic diagram of a structure of a charging system of an electronic device according to Embodiment 2 of this application.

Embodiment 2 of this application provides an electronic device provided with the charging system as shown in FIG. 7. The electronic device includes a processor, a battery detection module, a first switch, a battery, and a load. The processor is configured to turn off the first switch if a charger of the electronic device is in-position, and the first switch is located between the load of the electronic device and the battery of the electronic device. The battery detection module is configured to: after the load is disconnected from the battery, detect a change of an internal resistance of the battery to obtain an internal resistance test result.

In the foregoing method, the load is disconnected from the battery through the first switch, so as to avoid impact of the load on an internal resistance detection result of the battery during testing. This improves an accuracy of a battery internal resistance test.

In one example, as shown in FIG. 4, the first switch is located outside the battery, a first terminal of the first switch is connected to the load, a second terminal of the first switch is connected to a power supply output port of the battery, and a control terminal of the first switch is connected to the processor of the electronic device.

Specifically, the processor is provided with an SW pin for controlling an on/off state of the first switch. During internal resistance detection, the processor disconnects a Vbat network from the battery through the SW pin. In other words, the battery does not supply power to a first load. After internal resistance detection ends, the processor connects the Vbat network to the battery through the SW pin. In other words, the battery restores power supply to the first load.

The foregoing method of disposing the first switch outside the battery has a simple improvement process, so that the load is disconnected from the battery during detection of the internal resistance of the battery, to avoid impact of the load on a detection result of the internal resistance of the battery during testing and increase test accuracy of the internal resistance of the battery.

In another example, as shown in FIG. 5, the first switch is integrated in the battery, a first terminal of the first switch is connected to a power supply output port of the battery, a second terminal of the first switch is connected to a power supply output port of an cell in the battery, and a control terminal of the first switch is connected to the processor of the electronic device.

Specifically, the processor is configured with an SW pin for controlling an on/off state of the first switch. During internal resistance detection, the processor disconnects a Vbat network from the battery through the SW pin. In other words, the battery does not supply power to a first load. After internal resistance detection ends, the processor connects the Vbat network and the battery through the SW pin. In other words, the battery restores power supply to the first load.

The foregoing method of disposing the first switch outside the battery has a higher integration level, so that the load is disconnected from the battery during detection of the internal resistance of the battery, to avoid impact of the load on a detection result of the internal resistance of the battery during testing and increase test accuracy of the internal resistance of the battery.

In addition, the processor is further configured to turn on a charging chip of the electronic device, so that the charging chip supplies power to the load of the electronic device based on a power supply signal input by the charger.

Further, the charging chip of the electronic device includes a fast charging chip and a BUCK chip; and the processor is specifically configured to turn on the fast charging chip and turn off the BUCK chip.

Specifically, after the battery internal resistance test starts, the charger supplies power to the Vbat network through an SC fast charging chip in an on state, and then supplies power to the first load; and supplies power to the Vsys network through a Q4 transistor component in the BUCK chip, and then supplies power to a second load.

It should be noted that the charger can supply power to only the Vsys network through the BUCK chip and cannot supply power to the Vbat network through the Q4 transistor device, which is related to the charging chip disposed inside the electronic device. Therefore, in order to ensure the normal power supply of the load connected to the Vsys network and the load connected to the Vbat network, the SC fast charging chip is turned on, and the BUCK chip is turned off. In addition, power may be supplied, in another manner, to the first load connected to the Vbat network during testing, which is not limited in this application. During actual application, a model of the charging chip disposed inside the electronic device should be considered.

Further, after the internal resistance of the battery is detected when the first switch is in an off state, to obtain the internal resistance test result, the processor is further configured to turn on the first switch to connect the battery to the load. In this way, after the test scenario ends, a scenario of normal use for the user is restored, and the internal load of the electronic device is normally powered by the battery.

For example, the following provides a battery detection module used in a method for detecting an internal resistance and a method for determining a fault.

The battery detection module is specifically configured to: measure an open-circuit voltage of the battery or the cell at each of a start moment and an end moment of a testing period, to obtain a drop rate of the open-circuit voltage, where the drop rate indicates a magnitude of the internal resistance of the battery; repeat tests at preset intervals; and compare drop rates of two consecutive tests, where when a difference between the drop rates of two consecutive tests is greater than a preset threshold, it indicates that the internal resistance increases, and an increase in the internal resistance indicates that the battery is faulty.

As shown FIG. 4 and FIG. 5, the battery detection module collects a high-level signal Vbat+sense and a low-level signal Vbat-sense of the cell, and a difference between the high-level signal Vbat+sense and the low-level signal Vbat-sense is obtained as a real difference OCV(T) between two ends of the cell, namely, an open-circuit voltage (open circuit voltage, OCV for short) at a moment T.

OCV(T0) and OCV(T1) may be obtained at a start moment T0 and an end moment T1 of a testing period respectively. In the testing period, a drop rate of an open-circuit voltage is: [OCV(T1)−OCV(T0)]/(T1−T0). A greater value of the internal resistance of the battery indicates a greater drop rate.

The preset interval may be seven days, 10 days, or longer. Seven days are used as an example. Four drop rates may be obtained through detection and calculation within 28 days. In each of first three tests, an open-circuit voltage drops from 4.2 V to 4.1 V. In a fourth test, an open-circuit voltage drops from 4.2 V to 3.8 V. A drop rate in the fourth test is greater than a drop rate in each of the first three tests, which indicates an increase in the internal resistance of the battery. It should be noted that the foregoing example is used only to describe how the internal resistance of the battery is detected and how the battery is determined to be faulty in this embodiment of this application. During actual application, a fluctuation in values of the drop rates in two consecutive tests is allowed. When the difference between the drop rates in two consecutive tests is greater than the preset threshold, it is considered that the battery is at risk of a fault, and a reminder to replace the battery may be provided.

In conclusion, in this embodiment of this application, on the basis of an existing circuit, a switch is added to a path between a battery and an cell, and a battery voltage pin is connected to the cell module. As a result, in a specific scenario, the battery can be disconnected from a system load, and a change of a voltage of the cell can be directly tested, so that a change of an internal resistance of the cell can be directly monitored. This avoids impact of an external system load, and detection of the internal resistance of the cell is more accurate.

An embodiment of this application further provides a computer-readable storage medium. The computer-readable storage medium stores instructions. When the instructions are executed, a computer is enabled to perform the method for testing an internal resistance described in Embodiment 1.

Figure 8:
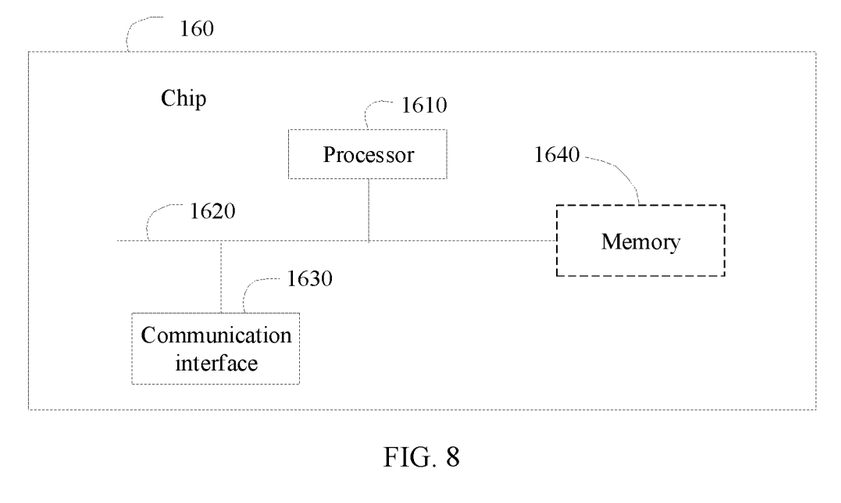
FIG. 8 is a schematic diagram of a structure of a chip according to Embodiment 2 of this application.

For example, FIG. 8 is a schematic diagram of a structure of a chip according to Embodiment 2 of this application. A chip 160 includes a communication interface 1630, and one, or two or more (including two) processors 1610.

In some implementations, a memory 1640 stores the following elements: an executable module or a data structure, or a subset thereof, or an extended set thereof.

In this embodiment of this application, the memory 1640 may include a read-only memory and a random access memory, and provides instructions and data to the processor 1610. A part of the memory 1640 may further include a non-volatile random access memory (non-volatile random access memory, NVRAM).

In this embodiment of this application, the memory 1640, the communication interface 1630, and the memory 1640 are coupled together through a bus system 1620. The bus system 1620 may further include a power bus, a control bus, a status signal bus, and the like, in addition to a data bus. For ease of description, various buses are marked as the bus system 1620 in FIG. 8.

The method described in embodiments of this application may be applied to the processor 1610 or implemented by the processor 1610. The processor 1610 may be an integrated circuit chip, having a signal processing capability. During implementation, the steps of the foregoing method may be completed by using hardware integrated logic circuits in the processor 1610 or instructions in the form of software. The foregoing processor 1610 may be a general purpose processor (for example, a microprocessor or a conventional processor), a digital signal processor (digital signal processing, DSP), an application specific integrated circuit (application specific integrated circuit, ASIC), a field-programmable gate array (field-programmable gate array, FPGA) or another programmable logic device, a discrete gate, a transistor logic device, or a discrete hardware component. The processor 1610 can implement or perform the methods, steps, and logical block diagrams disclosed in embodiments of the present invention.

The steps of the method disclosed in embodiments of this application may be directly performed by a hardware decoding processor, or by a combination of hardware and software modules in the decoding processor. The software module may be located in a mature storage medium in the field such as a random access memory, a read-only memory, a programmable read-only memory, or an electrically erasable programmable memory (electrically erasable programmable read only memory, EEPROM). The storage medium is located in the memory 1640, and the processor 1610 reads information in the memory 1640, and completes the steps in the foregoing method in combination with hardware thereof.

In the foregoing embodiment, the instructions stored in the memory for execution by the processor may be implemented in the form of a computer program product. The computer program product may be written in the memory in advance, or downloaded and installed in the memory in the form of software.

The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, including one or more usable media. For example, the usable medium may include a magnetic medium (for example, a floppy disk, a hard disk, or a magnetic tape), an optical medium (for example, a digital versatile disc (digital versatile disc, DVD)), a semiconductor medium (for example, a solid-state drive (solid state disk, SSD)), or the like.

An embodiment of this application further provides a computer-readable storage medium. All or a part of the method described in the foregoing embodiments may be implemented by software, hardware, firmware, or any combination thereof. The computer-readable medium may include a computer storage medium and a communication medium, and may further include any medium that can transmit a computer program from one place to another. The storage medium may be any target medium accessible by a computer.

As a possible design, the computer-readable medium may include a compact disc read-only memory (compact disc read-only memory, CD-ROM), a RAM, a ROM, an EEPROM or other disc storage. The computer-readable medium may include magnetic disk storage or other magnetic disk storage devices. Any connection line may also be appropriately referred to as a computer-readable medium. For example, if software is transmitted from a website, a server or another remote source by using a coaxial cable, an optical fiber cable, a twisted pair, a DSL, or a wireless technology (such as infrared, radio, and microwave), the coaxial cable, the optical fiber cable, the twisted pair, the DSL or the wireless technology such as infrared, radio, and microwave is included in the definition of the medium. The disk and disc, as used herein, include a compact disc (CD), a laser disc, an optical disc, a digital versatile disc (digital versatile disc, DVD), a floppy disk, and a Blu-ray disc. The disk typically reproduces data magnetically, while discs utilize laser to optically reproduce data.

A combination thereof should also be included in the scope of the computer-readable medium. The foregoing description illustrates merely specific implementations of the present invention. However, the scope of protection of the present invention is not limited thereto. Any variation or replacement readily figured out by a person skilled in the art within the technical scope disclosed in the present invention shall fall within the protection scope of the present invention. Therefore, the protection scope of the present invention shall be subject to the protection scope of the claims.

The person skilled in the art may easily figure out other implementation solutions of this application after considering the specification and practicing the invention disclosed herein. This application is intended to cover any variations, uses, or adaptive changes of this application. Such variations, uses, or adaptive changes follow the general principles of this application and include common knowledge or conventional technical means in the art that is not disclosed in this application. The specification and embodiments are merely considered as examples, and the true scope and spirit of this application are indicated by the following claims.

It should be understood that this application is not limited to the precise structures described above and shown in the accompanying drawings, and various modifications and changes can be made without departing from the scope of this application. The scope of this application is subject only to the appended claims.

What is claimed is:

1. A method for testing an internal resistance of a battery, applied to an electronic device, wherein the method comprises:
    obtaining an in-position status of a charger of the electronic device;
    turning on a fast charging chip of the electronic device and turning off a BUCK chip of the electronic device, wherein the fast charging chip supplies power to a load of the electronic device based on a power supply signal input by the charger of the electronic device;
    turning off a first switch when the charger of the electronic device is in-position, wherein the first switch is located between the load of the electronic device and a battery of the electronic device; and
    after the load is disconnected from the battery, detecting a change of an internal resistance of the battery to obtain an internal resistance test result.

2. The method according to claim 1, wherein the first switch is located outside the battery, a first terminal of the first switch is connected to the load of the electronic device, a second terminal of the first switch is connected to a power supply output port of the battery, and a control terminal of the first switch is connected to a processor of the electronic device.

3. The method according to claim 1, wherein the first switch is integrated in the battery, a first terminal of the first switch is connected to a power supply output port of the battery, a second terminal of the first switch is connected to a power supply output port of a cell in the battery, and a control terminal of the first switch is connected to a processor of the electronic device.

4. The method according to claim 1 further comprising:
    after detecting the change of the internal resistance of the battery to obtain the internal resistance test result, turning on the first switch to connect the battery and the load.

5. The method according to claim 1, wherein detecting the change of the internal resistance of the battery to obtain the internal resistance test result comprises:
    measuring an open-circuit voltage of the battery or a cell of the battery at each of a start moment and an end moment of a testing period, to obtain a drop rate of the open-circuit voltage, wherein the drop rate indicates a magnitude of the internal resistance;
    performing a plurality of tests at preset intervals; and
    comparing drop rates of two consecutive tests, wherein when a difference between the drop rates is greater than a preset threshold, it indicates that the internal resistance increases, and an increase in the internal resistance indicates that the battery is faulty.

6. The method according to claim 1, wherein turning off a first switch when the charger of the electronic device is in-position comprises:
    turning off the first switch when the charger of the electronic device is in-position, and the electronic device is fully charged and in a standby state.

7. The method according to claim 1, wherein the BUCK chip comprises at least three transistors and a controller.

8. An electronic device, comprising a processor, a battery detection circuit, a first switch, a battery, and a load, wherein;
    the processor is configured to:
        turn on a fast charging chip of the electronic device and turn off a BUCK chip of the electronic device, wherein the fast charging chip supplies power to the load based on a power supply signal input by a charger; and
        turn off the first switch when the charger of the electronic device is in-position, and the first switch is located between the load of the electronic device and the battery of the electronic device; and
    the battery detection circuit is configured to: after the load is disconnected from the battery, detect a change of an internal resistance of the battery to obtain an internal resistance test result.

9. The device according to claim 8, wherein the first switch is located outside the battery, a first terminal of the first switch is connected to the load, a second terminal of the first switch is connected to a power supply output port of the battery, and a control terminal of the first switch is connected to the processor of the electronic device.

10. The device according to claim 8, wherein the first switch is integrated in the battery, a first terminal of the first switch is connected to a power supply output port of the battery, a second terminal of the first switch is connected to a power supply output port of a cell in the battery, and a control terminal of the first switch is connected to the processor of the electronic device.

11. The device according to claim 8, wherein
    the processor is further configured to: after the change of internal resistance of the battery is detected to obtain the internal resistance test result after the load is disconnected from the battery,
    turn on the first switch to connect the battery and the load.

12. The device according to claim 8, wherein
    the battery detection circuit is specifically configured to:
    measure an open-circuit voltage of the battery or a cell of the battery at each of a start moment and an end moment of a testing period, to obtain a drop rate of the open-circuit voltage, wherein the drop rate indicates a magnitude of the internal resistance of the battery;
    repeat tests at preset intervals; and
    compare drop rates of two consecutive tests, wherein when a difference between the drop rates is greater than a preset threshold, it indicates that the internal resistance increases, and
    an increase in the internal resistance indicates that the battery is faulty.

13. The electronic device according to claim 8, wherein turning off the first switch when the charger of the electronic device is in-position comprises:
    turning off the first switch when the charger of the electronic device is in-position, and the electronic device is fully charged and in a standby state.

14. The electronic device according to claim 8, wherein the BUCK chip comprises at least three transistors and a controller.

15. A method for testing an internal resistance of a battery, applied to an electronic device, wherein the method comprises:

obtaining an in-position status of a charger of the electronic device; and turning off a first switch when the charger of the electronic device is in-position, wherein the first switch is located between a load of the electronic device and a battery of the electronic device and is configured to disconnect a Vbat network from the battery;

wherein before the turning off a first switch, the method further comprises:

turning on a fast charging chip of the device and turning off a BUCK chip of the device, wherein the fast charging chip supplies power to the load of the electronic device based on a power supply signal input by the charger, wherein a voltage of the Vbat network is provided by the fast charging chip; and after the load is disconnected from the battery, detecting a change of an internal resistance of the battery to obtain an internal resistance test result.

16. The method according to claim 15, wherein the first switch is located outside the battery, a first terminal of the first switch is connected to the load of the electronic device, a second terminal of the first switch is connected to a power supply output port of the battery, and a control terminal of the first switch is connected to a processor of the electronic device.

17. The method according to claim 15, wherein the first switch is integrated in the battery, a first terminal of the first switch is connected to a power supply output port of the battery, a second terminal of the first switch is connected to a power supply output port of a cell in the battery, and a control terminal of the first switch is connected to a processor of the electronic device.

18. The method according to claim 15, further comprising:

after detecting the change of the internal resistance of the battery to obtain the internal resistance test result, turning on the first switch to connect the battery and the load.

19. The method according to claim 15, wherein detecting the change of the internal resistance of the battery to obtain the internal resistance test result comprises:

measuring an open-circuit voltage of the battery or a cell of the battery at each of a start moment and an end moment of a testing period, to obtain a drop rate of the open-circuit voltage, wherein the drop rate indicates a magnitude of the internal resistance;

performing a plurality of tests at preset intervals; and comparing drop rates of two consecutive tests, wherein when a difference between the drop rates is greater than a preset threshold, it indicates that the internal resistance increases, and an increase in the internal resistance indicates that the battery is faulty.

20. The method according to claim 15, wherein turning off the first switch when the charger of the electronic device is in-position comprises:

turning off the first switch when the charger of the electronic device is in-position, and the electronic device is fully charged and in a standby state.

* * * * *